Figure 1:
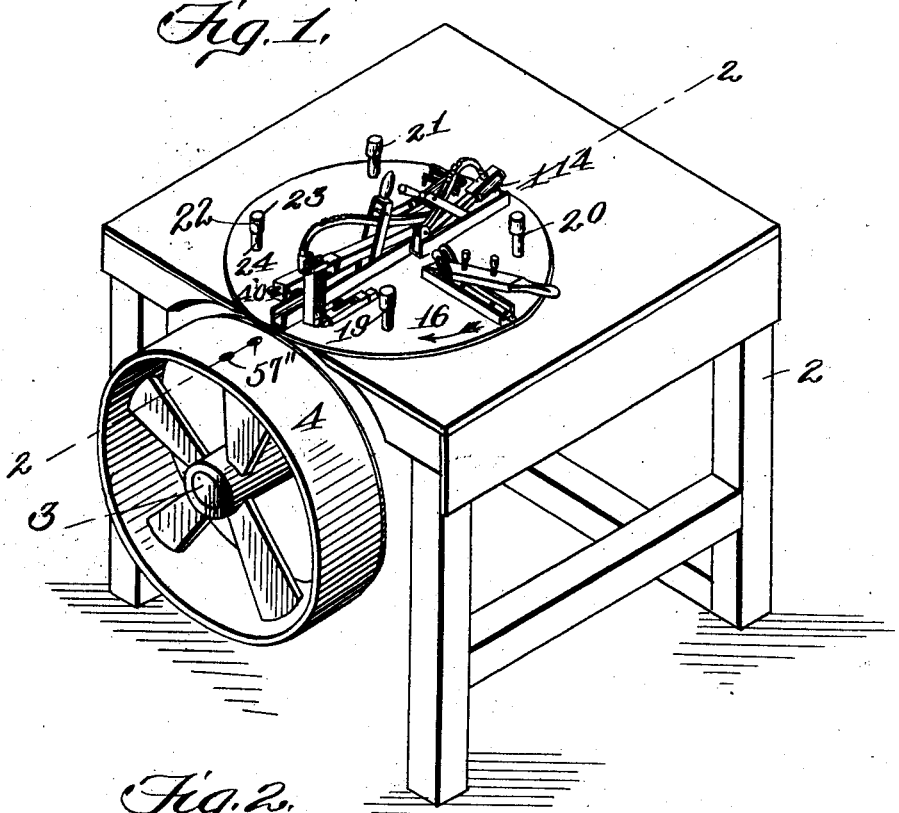

No. 745,300. PATENTED NOV. 24, 1903.
U. P. SMITH.
MACHINE FOR MAKING PNEUMATIC TIRES.
APPLICATION FILED NOV. 25, 1902.
NO MODEL. 6 SHEETS—SHEET 1.

Witnesses
C. D. Kesler.
J. B. Keefer.

Inventor
Uzziel P. Smith
By James L. Norris.
Atty.

No. 745,300. PATENTED NOV. 24, 1903.
U. P. SMITH.
MACHINE FOR MAKING PNEUMATIC TIRES.
APPLICATION FILED NOV. 25, 1902.
NO MODEL. 6 SHEETS—SHEET 2.
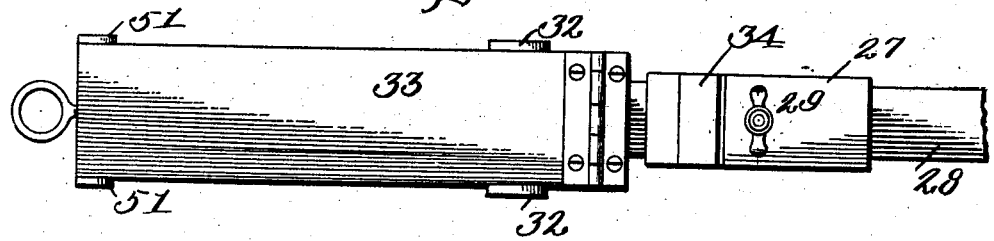
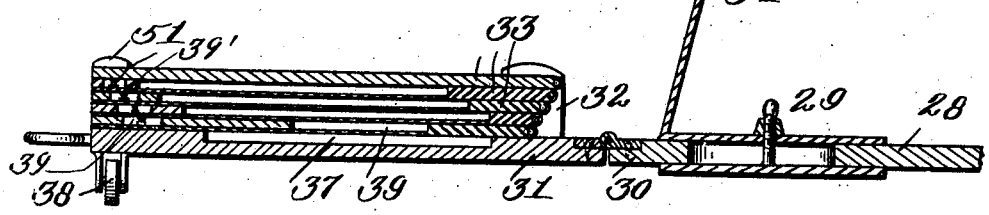
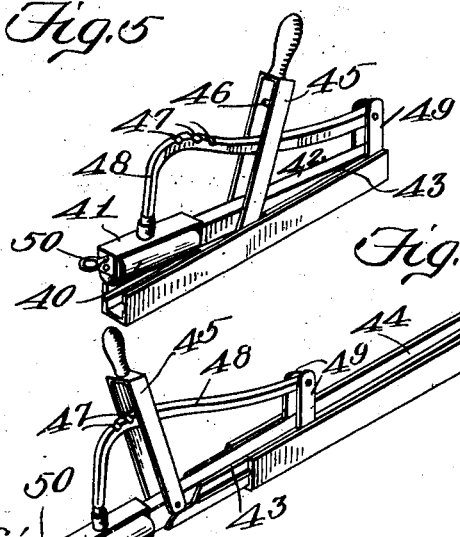
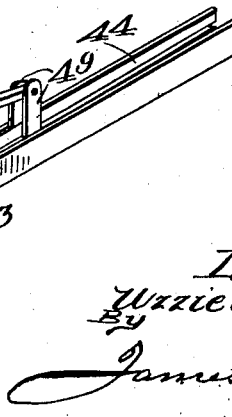
Witnesses:
Inventor
Uzziel P. Smith
By James L. Norris
Atty

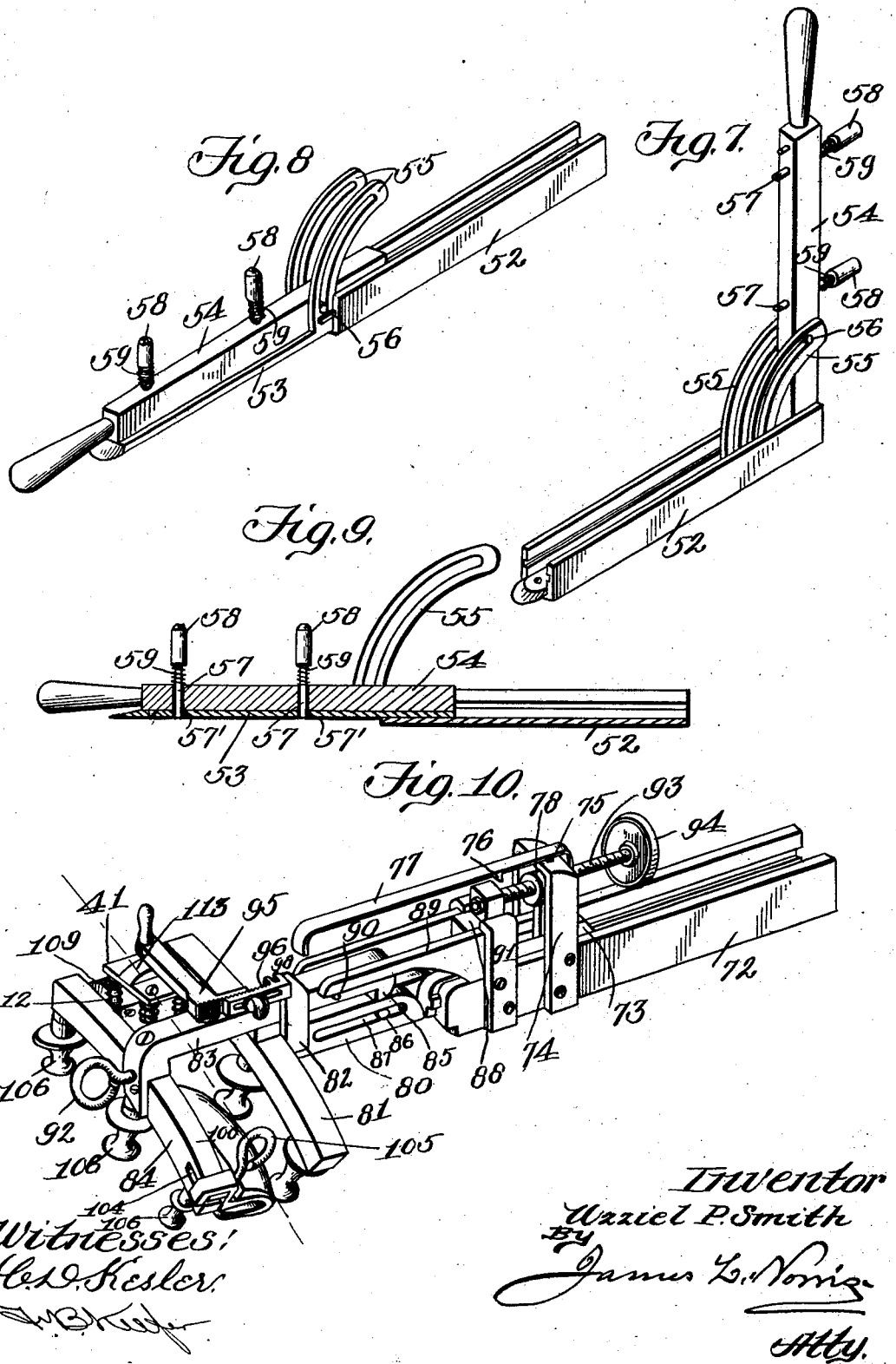

No. 745,300. PATENTED NOV. 24, 1903.
U. P. SMITH.
MACHINE FOR MAKING PNEUMATIC TIRES.
APPLICATION FILED NOV. 25, 1902.
NO MODEL. 6 SHEETS—SHEET 4.
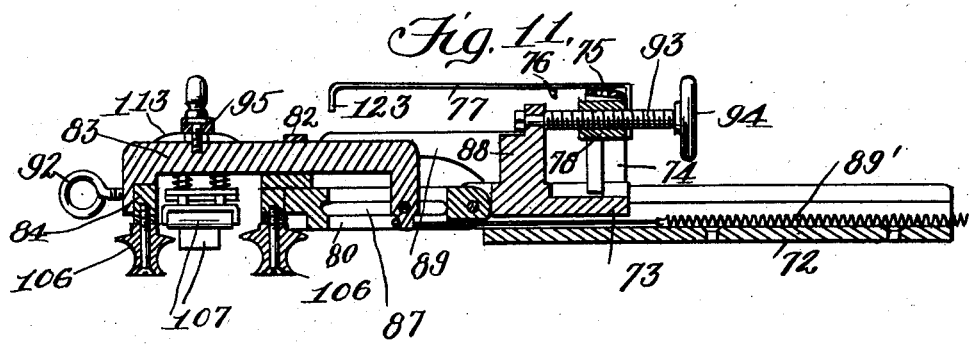
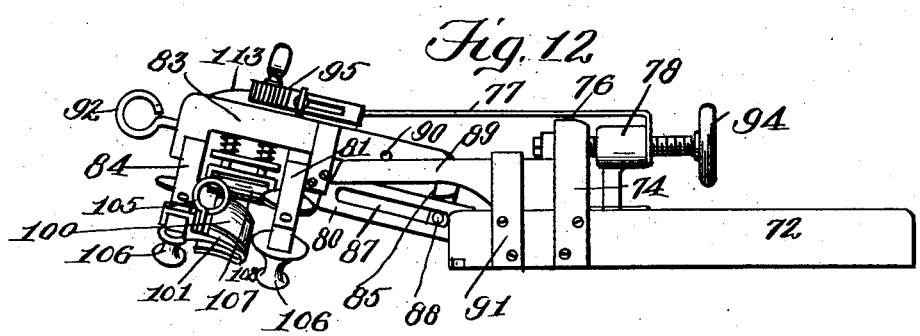
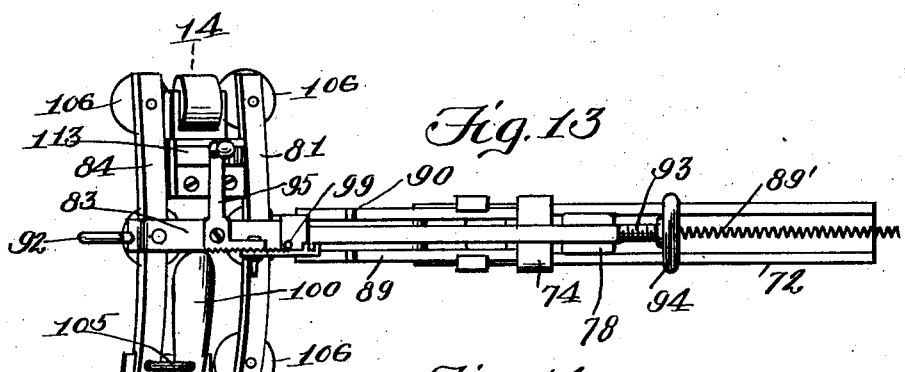
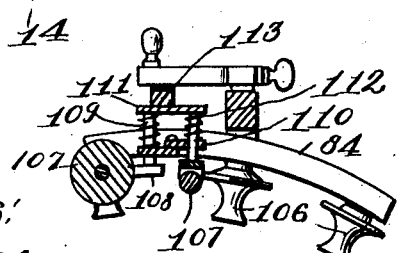
Witnesses:
Inventor
Uzziel P. Smith
By James L. Norris
Atty No. 745,300. PATENTED NOV. 24, 1903.
U. P. SMITH.
MACHINE FOR MAKING PNEUMATIC TIRES.
APPLICATION FILED NOV. 25, 1902.
NO MODEL. 6 SHEETS—SHEET 5.
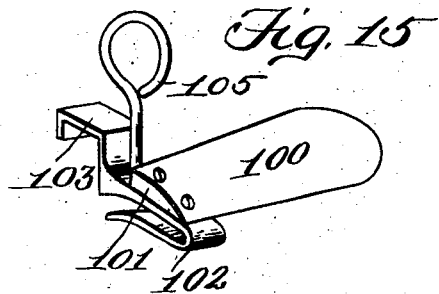
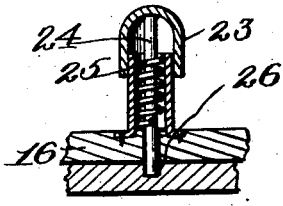
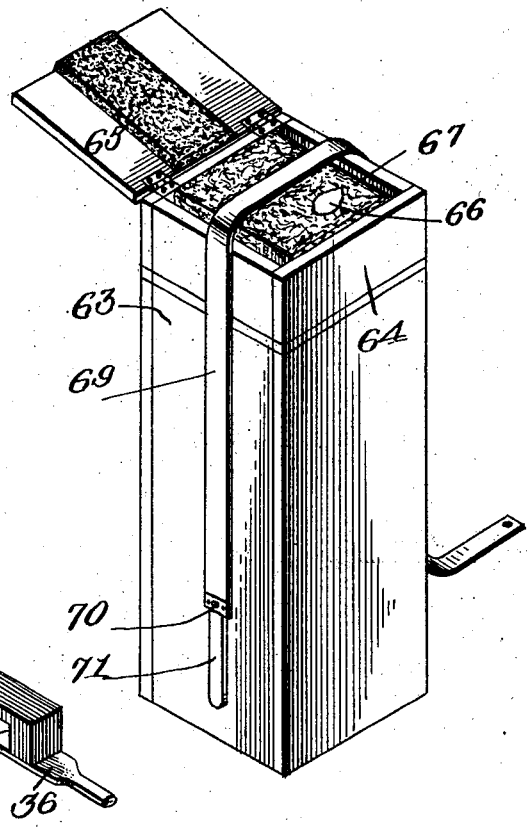
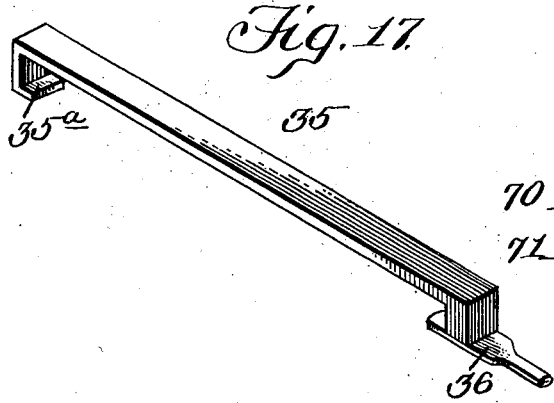
Witnesses:
C. L. Kesler
F. B. Keefe
Inventor
Uzziel P. Smith
By James L. Norris
Atty.

No. 745,300. PATENTED NOV. 24, 1903.
U. P. SMITH.
MACHINE FOR MAKING PNEUMATIC TIRES.
APPLICATION FILED NOV. 25, 1902.
NO MODEL. 6 SHEETS—SHEET 6.

Witnesses:
C. D. Kesler,
F. B. K—

Inventor
Uzziel P. Smith
By James L. Norris
Atty.

No. 745,300. Patented November 24, 1903.

UNITED STATES PATENT OFFICE.

UZZIEL P. SMITH, OF CHICAGO, ILLINOIS.

MACHINE FOR MAKING PNEUMATIC TIRES.

SPECIFICATION forming part of Letters Patent No. 745,300, dated November 24, 1903.

Application filed November 25, 1902. Serial No. 132,760. (No model.)

*To all whom it may concern:*

Be it known that I, UZZIEL P. SMITH, a citizen of the United States, residing at Chicago, in the county of Cook and State of Illinois, have invented new and useful Improvements in Machines for Making Pneumatic Tires, of which the following is a specification.

This invention relates to a machine for making pneumatic tires; and the object of the invention is to render the manufacture of such articles more rapid and less laborious than when made by the hand methods in common use, the resultant tire made by the said machine being thoroughly resilient and of uniform thickness throughout its entire circumference.

The method usually followed in making a pneumatic tire is to first form the material of which said tire is to be composed into a straight tube, laying it up by hand on a table or flat surface and afterward rolling it upon a pole or by building it up in the first instance upon a pole and then joining or splicing the ends together, thereby producing a complete annular tube. The process of uniting the ends together is an extremely difficult one, requiring great care and skill, as the several layers or plies of rubber and fabric of which the tire is composed are required to be nicely and firmly cemented together in such a manner as to make the tire as even as possible at the joint and at the same time strong and air-tight at such point. In order to accomplish this result, short strips of the material used in making the tire have to be inserted and lapped upon the several layers as the blank comes from the pole, which involves doubling the thickness of each layer at the joint and making the sheath at such place much thicker than at any other point in the tire. This not only detracts materially from the appearance of the tire, even after it is cured, but renders it less yielding and resilient at the joint and more liable to open or leak at such joint than at any other point. In other words, the weak point in the tires of the character just set forth is caused largely by defective splicing, and many of said tires are destroyed simply by the process of curing them.

There is another way of making pneumatic tires in use to a somewhat limited extent which avoids the necesssity of splicing, and consists in building up the rubber and fabric strips upon a wide drum by hand in the following manner, viz: A layer of fabric and a superposed layer of rubber are first laid upon a drum near one edge of the same and are folded together by hand over a short core, which is pulled along from time to time as the folding progresses. When the folding is practically completed, the core is withdrawn and the folding operation concluded without the core. This forms an annular tube which is known as an "air-bag." The remaining layers that are to make up the tire are superposed in overlapping relation around the drum adjacent to the air-bag. The air-bag is then inflated and in such condition is rolled by hand over the additional layers for the purpose of uniting the latter to the air-bag, and when they are united the article made forms a complete tire. A tire constructed in this manner contains no splice; but the process of making the same is wholly a hand one, and in rolling the air-bag over the layers that constitute the outer skin of the tire the contact and pressure of the hands upon the air-bag and layers at different points in the circumference of the tire serves to press the material more closely together at these points than at the other portions of the tire, so that when completed the article is uneven in its tubular circumference.

In the methods of construction hereinbefore mentioned the several layers comprising the sheath or body of the tire are fastened together by the pressure of manually-operated rollers, which is slow and laborious and an operation requiring great care in order to thoroughly roll every portion of the material in such a manner as to insure the complete removal of the air from between the several layers or plies and firmly press together the several laps of the material.

The present machine is operated by power, and the laborious and difficult work heretofore accomplished by hand is done automatically and in an efficient and rapid manner.

While the machine is intended, primarily, for making pneumatic-tires, it is not my intention to limit the invention in this respect, for such machine can be employed with equal advantage in the making of other tubular structures.

In the drawings accompanying and forming part of this specification I have illustrated a convenient organization for making tires or analagous tubular articles; but it is not my intention to limit the invention to such organization, as many variations in the construction of the different mechanisms thereof may be adopted.

Figure 2:
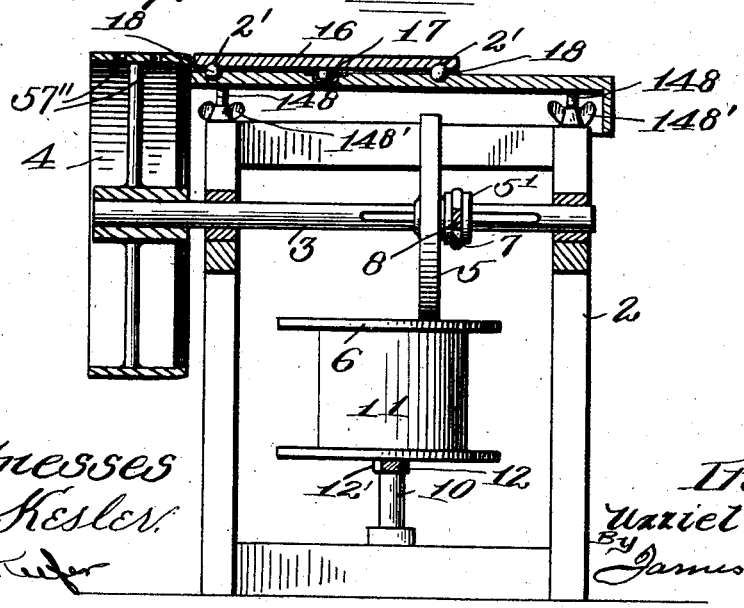
Figure 19:
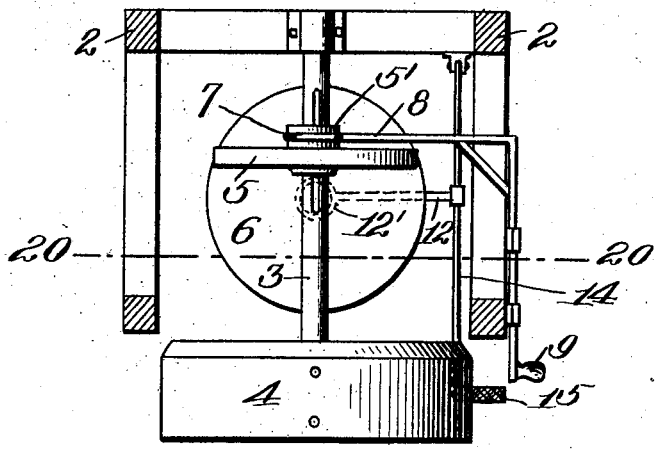
Figure 20:
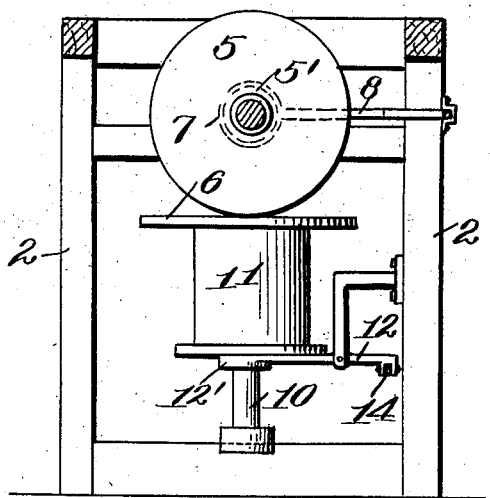

In the said drawings, Figure 1 is a perspective view of the complete machine. Fig. 2 is a sectional elevation of the machine, the section being taken in the line 2 2, Fig. 1. Fig. 3 is a plan view of the stock layer shown in Fig. 1. Fig. 4 is a longitudinal central section of the same. Figs. 5 and 6 are detail perspective views of the large or wide roller and coöperating parts, shown in Fig. 1 and representing the roller in its two positions. Figs. 7 and 8 are similar views of the punch and coöperating parts. Fig. 9 is a longitudinal central section of the same. Fig. 10 is a perspective view of the tube-forming mechanism, showing the parts thereof in their operative positions. Fig. 11 is a longitudinal central section of said tube-forming mechanism, the parts being also in their operative positions. Fig. 12 is a side elevation, and Fig. 13 is a top plan view of the same, the parts being illustrated in their ineffective or normal positions. Fig. 14 is a sectional elevation in the line 14 14, Fig. 13. Fig. 15 is a perspective view of the strip-folding device. Fig. 16 is a sectional detail view of one of the turn-table-operating handles and the keeper which coöperates with the bolt of said handle. Fig. 17 is a perspective view of a clamp. Fig. 18 is a view of the core and supporting-pedestal for sustaining the soap-water-containing box. Fig. 19 is a plan view of the machine shown in Fig. 1, the parts of the top broken away; and Fig. 20 is a sectional front elevation of part of the machine, the section being taken on the line 20 20, Fig. 19.

Like characters refer to like parts in the several figures of the drawings.

The different parts of the machine may be mounted upon any suitable framework. That shown is denoted by 2 and consists of a table, which is usually made wholly of metal. The table should be sufficiently high to enable the operator to perform his work easily.

Supported by suitable bearings below the top of the table or framing 2 is a shaft 3, which projects beyond the front of the table, and a drum 4 is removably secured in some convenient manner to the projecting end of said shaft. The layers or plies which are to constitute the tire are adapted to be superposed upon the surface or periphery of the drum and generally in overlapping relation.

Upon the shaft 3 at or near its inner end is a driven member 5, which is shown as consisting of a disk slidable along the shaft and splined thereto. The disk 5 coöperates with the driving-disk 6, it being seen that the axes of the two disks are at right angles to each other. When the upper flat face of the driving-disk 6 is in contact with the periphery of the driven disk 5 and when the former is rotated, the driven disk will be rotated by its companion, and the speed of the driven disk can be varied by moving the same longitudinally of the shaft 3 or toward and from the center of the driving-disk 6.

The driven disk 5 is provided with a central hub 5', in which an annular channel is formed which is adapted to receive the ring 7 upon the inner end of one branch of the approximately right-angular arm 8, the other branch of said arm being provided with a handle 9. By moving the disk-shifting arm 8 backward or forward through the medium of the hadle 9 the position of the driven disk with respect to the driving one can be changed in order to vary the velocity of said driven disk and drum 4.

A spindle 10 depends centrally from the driving-disk 6 and fixedly carries between its ends the pulley 11 or other power-transmitting member. Said spindle below the pulley 11 is embraced by a ring 12' at the inner end of the shifting-lever 12, fulcrumed between its extremities to the hanger 13, (see Figs. 19 and 20,) suitably connected with the framework 2.

The free end of the disk-shifting lever 12 is adapted to be actuated by the foot-lever 14, fulcrumed at its rear to a suitable bracket upon the inside of the framing below the top thereof, said foot-lever being situated above and against the disk-shifting lever 12. Normally the driving-disk 6 is out of contact with the companion disk 5, the lower end of the spindle 10 during this time resting upon the floor or other support upon which the machine is mounted. On pressing the treadle 15 at the free end of the foot-lever 14 downward the inner arm of the lever 12 will be elevated, so as to carry the driving-disk 6 into coöperative relation with the driven disk 5 in order to rotate the latter, it being understood that the pulley 11 is continuously operated.

When the foot is taken from the treadle 15, the driving-disk 6, and hence the pulley 11 and spindle 10, are adapted to fall by their own weight, so that said disk is carried away from the other disk, thereby throwing the latter out of action, and consequently stopping the drum 4. With the two disks out of contact the drum may be freely rotated by hand in order to bring any part of the periphery or surface thereof in line or substantially in line with the top of the table or framing 2. By virtue of the frictional driving mechanism it is necessary to move the disk but a very small distance in order to put it into working relation with the driven disk 5.

While I have described a frictional driving mechanism for effecting the intermittent rotation of the drum 4 and for also changing the speed of the same, the invention is not limited in this respect, for it is obvious that equivalent means might be employed for effecting the same results.

The different driving and speed controlling devices for the rotary drum 4 are situated, preferably, under the top of the table or framing 2, where they are out of the way, by reason of which compactness is secured.

In order to avoid confusion, I have not shown the shifting mechanism for the disks 5 and 6 in Fig. 1, but have represented the same in detail in Figs. 19 and 20.

Upon the top of the framework 2 is mounted the turn-table 16, which sustains the stock-laying, tube-punching, tube-forming, and tube-rolling devices, hereinafter more particularly described, and which are adapted to be successively brought into use by rotating the turn-table. The turn-table is provided on its under side (see Fig. 2) and centrally thereof with a depending pin 17, fitted in a step or bearing countersunk in the top of the frame 2, said top having an annular groove 2' to receive antifriction-balls 18, which sustain the turn-table 16 near its outer edge.

Upon the upper side of the turn-table 16 and at substantially equidistant points are situated vertical handles 19, 20, 21, and 22, each of which includes a tubular body extending downward through perforations in the turn-table and having flanges along their bottoms fastened to the upper side of said turn-table in some suitable manner. (See Fig. 16.) The tubular bodies of the handles are provided at their tops with vertically-slidable caps or thimbles 23, from which the bolts 24 centrally depend, it being understood that the bolts are inclosed by such tubular bodies. Said bolts are surrounded by the coiled springs 25, connected thereto and to the thimbles, the action of the springs being to force the bolts downward from the said tubular portions.

In the upper side of the table 2 is countersunk a socket 26, adapted to successively receive the lower ends of the several bolts.

It will be assumed that the lower or working end of the bolt forming part of the handle 19 is seated in the socket 26, whereby the turn-table is held against rotation in order to maintain the stock layer and a coöperating pressure-roller, hereinafter more particularly described, in working relation to the drum 4.

The stock layer, as will hereinafter appear, is provided to maintain the uniform lateral relation of the several strips throughout their length that are to compose the tire, the stock-roller pressing such strips into permanent adherence after they have been properly laid upon the drum. After the composite strip has been made and pressed together it is punched, as will hereinafter appear, in order to effect the insertion of the valve-stem. To bring the punch in working relation with the drum, it is necessary to turn the turn-table approximately the quarter part of a circle. To do this, the bolt 24, constituting a part of the handle 19, is lifted out of the socket 26 by elevating the proper thimble 23. When this is done, the table is turned in the direction of the arrow shown in Fig. 1. When the bolt 24 of the handle 20 comes opposite the socket 26, it is shot thereinto by the power of the coiled spring 25 in order to hold the turn-table stationary while the tire-blank is being punched. After the blank is punched, as will hereinafter appear, it is formed into tubular shape, and to bring the tube-forming means to the working point it will be necessary to again shift the table, and this is accomplished by lifting the bolt 24 of the second handle 20 out of the socket 26 in the manner hereinbefore described and turning the table until the tube-forming device reaches the proper point, at which place said table is again fastened by the bolt of the handle 21. It will be understood, therefore, that means are provided for positively holding the turn-table in a fixed or stationary position with a mechanism properly located adjacent to the drum 4 while said mechanism is performing its particular office in the manufacture of the tire.

The drum 4 is adapted to receive upon its outer surface or periphery a series of strips which are laid upon each other in superposed order, and in the present case lateral overlapping relation, and means are provided, and preferably carried by the turn-table 16, for maintaining the uniform lateral relation of the strips as the drum rotates, the strips being wound upon the drum during such operation. Extending crosswise and suitably fastened to the upper side of the turn-table 16 is the slideway 27 of the stock layer, (see Figs. 1, 3, and 4,) shown as substantially rectangular and upon which the channeled slide 28 is adapted to move freely back and forth, said slide being adjustably connected with the slideway by means of a screw and longitudinal slot connection, (denoted in a general way by 29.)

The slide 28 terminates at its outer end in a cross-head 30, to which is hinged the foundation-plate of leaf 31 of the stock layer, which is provided at its outer end with a suitably-supported antifriction-roller 38, adapted to engage the periphery of the drum and to hold the foundation-plate in proper relation with the drum, and at the opposite or hinged end it is provided with the side lugs or ears 32, between which the other leaves or plates 33, hereinafter described, are pivoted, the several leaves being adapted to fold or close upon each other.

When the stock layer is not in use, the several leaves are folded together face to face and occupy a substantially vertical position, with the inmost plate abutting against the upright stop 34, the body of which is fastened to the slide 28 in some suitable manner. The stock layer (shown in Figs. 3 and 4) is designed for the purpose of laying a composite strip composed of five strips or layers—viz., an outer rubber cover, a rubber tread, two strips or layers of frictional duck or other fabric, and a rubber layer which is to compose the inner tube; but this number may of course be increased or diminished, and their relation to each other may be varied to make different types of tires. In order to prevent lateral motion of the leaves during laying of the stock, I provide the foundation-leaf 31 with vertical projections 51, between which the free ends of the leaves 33 are adapted to be disposed when folded one upon another. The outer walls of the several channels in the leaves or plates are formed upon the blocks 39, having elongated slots through which adjusting-screws 39' are passed, said screws being tapped into the bodies of the respective leaves, whereby the widths of said channels can be varied in order to accommodate strips of different widths and also for the purpose of varying the laying of the several strips with reference to each other in order to increase or diminish the width of the several laps, as may be desired.

The clamp 35 (shown in Fig. 17) is used in conjunction with the stock layer in placing around the drum the first strip in order to keep said strip in position on the drum during the process of laying, as the drum being of iron or other metal the strip will not adhere to it. The clamp 35 is detached from the drum and can be inserted over the edges of the drum at any point in its periphery that may be desired by placing the projection 35ª of the clamp over one edge of the drum and then turning the pivoted latch 36 by its handle in such a direction as to allow the working end of said latch to pass over the other edge of the drum when the latch is again turned into the position shown in said figure, which passes beneath the flange or periphery of the drum and locks the clamp firmly thereto with the first strip firmly secured between the clamp and the drum.

The operation of forming a composite blank from which a tire is made is as follows: The turn-table 16 is rotated so as to bring the stock layer directly opposite the drum 4. The slide 28 is then moved outward, and the undermost or foundation leaf 31 is swung down into a horizontal position and across the periphery of the drum 4, with the friction-roller 38 resting upon the periphery of the drum. The strip which is to compose the outer cover of the tire is placed in the channel or recess 37 of this foundation-plate near its front end, and the second plate 33 is then dropped down over the foundation-plate, which completely incloses the strip within the channel 37 of the foundation-plate. The clamp 35 is then fastened to the drum, as above described, over said layer and between the front end of said layer and the stock layer, and the drum 4 is then rotated by throwing the continuously-operating driving member 6 into contact with the driven member 5 in the manner hereinbefore described. This results in drawing the rubber strip through the channel 37, which is approximately of the same width as the rubber strip, whereby said strip will be laid upon the periphery of the drum in an absolutely correct manner. The ends of the said strips are then properly lapped and pressed together, forming a complete annular strip of rubber around the periphery of the drum. The clamp 35 is then removed from the drum and strip and is not again brought into use during the process of completing the composite strip. The rubber strip which is to compose the tread of the tire is then laid within the channel 39 in the upper surface of the second leaf or plate 33, near the front end of said strip, and the front end of said strip pressed down upon the preceding strip, to which it adheres. The third leaf 33 of the stock layer is then dropped down over the second leaf, completely inclosing such tread layer within the channel 39. The drum is then rotated as before, laying this strip around the periphery of the drum and over the preceding layer on a fixed line near the center of the preceding strip or outer cover of the tire. The ends of the strip are then properly lapped and pressed together, and the first layer of frictional duck or fabric is then placed within the channel 39 upon the upper surface of the third leaf 33 of the stock layer, near the front end, and this end is then pressed down upon the preceding layers and adheres thereto. The fourth leaf of the stock layer is then swung down upon the third leaf, completely inclosing such fabric within the channel 39. The drum is again rotated as before and the frictional layer of duck or fabric is drawn through the channel 39 of the third leaf upon and over the preceding layers in a perfectly true and proper position around the periphery of the drum. The ends are then properly lapped and pressed together. The second strip of fabric is then placed into position in the fourth leaf and the fifth leaf is swung down and a similar operation takes place. The fifth layer of rubber to compose the air-tube of the tire is then placed in position in the fifth leaf of the stock layer, when the top or plain leaf 33 is swung down and a like operation takes place, which completes the laying of the composite strip if it is to be composed of five strips. The stock-roller 40, which is attached to the turn-table parallel with the stock layer, so as to be operated in connection with it without moving the turn-table, is now drawn forward over the periphery of the drum and the composite layer, and this layer is now thoroughly rolled and pressed together by means of this roller.

The superposed channels in the stock layer, as will be seen, are disposed in overlapping relation and maintain the strips in absolutely proper relation with each other throughout the entire length of the tire, which insures a perfectly uniform lapping of the edges of the composite strip, a very essential thing if a good tire is to be made, which is very hard, if not impossible, to accomplish even by an expert by the hand laying process in universal use.

The roller 40 is journaled in the depending arms of a yoke 41 (see Figs. 5 and 6) at the outer end of the arm 42, pivoted at its inner end between the vertical walls of a channeled slide 43, movable in the slideway 44, rigidly fastened to the upper side of the table 16 in parallelism with the slideway 27. A bifurcated lever 45 has its branches fulcrumed to the slide 43, near the outer end thereof, the cross-piece at the upper end of said lever being provided with a handle by which the lever can be readily manipulated. The branches of the bifurcated lever are united below their upper end by a bridge-piece 46, consisting, preferably, of an antifriction-roller which is adapted to coöperate with the notches 47 upon the upper side of the long arm of the approximately L-shaped bar 48, said long arm being pivoted between the ears 49 at the inner end of the slide 43 and its short arm being suitably united to the yoke 41 upon the upper side of the latter substantially midway between its ends. When the pressure-roller 40 is not in use, the slide 43, to which the same is connected, is thrown back between the side walls of the slideway 44, the carrier or arm 42 of said bar being at this time at an angle to the upper surface of the turn-table. When it is desired to employ the roller for pressing the strips of the tire-blank together, the slide 43, and consequently the arm 42 and roller 40, connected therewith, are pulled out by means of the handle 50 upon the outer end of the yoke 40, so as to carry the roller across the periphery of the drum 4, the length of the roller being slightly greater than the width of the composite strip hereinbefore described. When the slide and roller are moved out the requisite distance, the lever 45 is swung forward by hand, and it rides up the upwardly-inclined portion of the long arm of the L-shaped bar 48 and into the notches 47 therein, thereby forcing the roller downward into a horizontal position and firmly into contact with the layers or strips of material which have been laid upon the drum. When, therefore, the drum is rotated, the roller, the periphery of which is preferably of yieldable material, serves to firmly and uniformly press the said strips together, whereby they will be permanently united.

After the several strips are superposed upon one another and pressed together to make a composite strip or tire-blank they are perforated to receive the valve-stem of the tire, and I will now set forth a convenient means for accomplishing this result.

Extending substantially at right angles to the slideways 27 and 44 upon the upper side of the turn-table 16 is a third slideway 52, (see Figs. 1, 7, 8, and 9,) shown as channeled, and in which the slide 53 is movable. The punch-carrying body 54 is pivoted to the slide 53, at or near the inner end thereof, and its outer end is furnished with a handle by which said body can be moved into and out of its effective position. The slide 53 is provided at a suitable point in its length and upon opposite sides thereof with the parallel segmental extensions 55, having arcuate slots to receive the pins 56 upon the opposite sides of the punch-carrying body 54, whereby the proper movement of said body is assured as it is raised and lowered. The body 54 is perforated at different points in its length to receive the punches 57, the lower ends of which are provided with circular cutting edges. The upper ends of the punches are headed at 58, and the stems of the punches are surrounded by coiled springs 59, bearing against said heads and also against the body 54, the function of the springs being normally to maintain the punches up and with the cutting edges flush or substantially flush with the under surface of the body 54. These punches are so positioned that they perforate the tire-blank at the precise points desired. After the strips have been rolled together in the manner hereinbefore described the turntable is given approximately a quarter of a turn, so as to bring the punch-slideway 52 to a point substantially at right angles to the periphery of the drum 4. The slide 53 is then pulled out and across the drum and below the composite tire-blank laid upon said drum. The punch-carrying body is then swung down upon the composite strip, and the heads 58 of the punches are struck by a suitable tool, so that the punches are forced through the composite strip and into the holes 57' made for their reception in said slide 53. After the punches have been struck they are returned to their normal positions by the coiled springs 59, after which the punch-carrying body 54 is elevated, and the said body 54 and the slide 53 are moved back to their original positions on the turn-table 16. After the holes are punched the valve-stem is inserted and a hand-clamp which fits the seat of the valve-stem is placed over this seat and by a blow from a hammer fastens the valve-stem in position, such clamp not being shown. The material punched from the composite strip passes through holes 57" in the periphery of the drum 4 and after passing through said holes falls on the floor. It will be understood that at this point there is upon the drum an annular band, the ends of which are permanently overlapped and the plies or strips of which are laterally and permanently overlapped, the stock layer hereinbefore described constituting a means for securing the uniform lateral relation of the strips throughout the entire length of circumference of the annular tire-blank, and that the several strips have no air between them. After the annular tire-blank has been punched it is formed into a tube, as will hereinafter appear.

I arrange in close proximity to the framework or table 2 a pedestal 63, (shown only in Fig. 18,) surmounted by a box 64, the lid of which upon its under side is lined with several layers of flannel 65 or equivalent material, and in the body of the box at its top is a slat or support 66, the upper side of which is also covered by several layers of flannel 67, which extend down on each side of the slat or support and into the box and to the bottom thereof, so that when the lid of the box is closed the flannel upon the said lid comes in contact with the flannel upon the slat or support. This box is kept filled with soap-water or its equivalent, which saturates the flannel strips hereinbefore mentioned.

A flexible core, as 69, is shown as hanging over the pedestal, and this core is employed in forming the composite tire-blank into tubular form. The core 69 is usually made of what is known as "frictional duck" or muslin, or it may be of any other suitable material and is long enough to extend entirely around the drum and the several strips of material laid thereon, the ends of the core being fastened together by a pin 70 near one end, adapted to enter a perforation near the other end. The core or strip 69 is provided at one end with a flexible strap or handle 71, by which the same can be withdrawn from the tire after it is nearly made into tubular form. It will be understood that the core or strip 69 is drawn across the flannel in the box 64, so as to coat the core with soap-water, whereby when it is laid on the composite blank upon the drum 4 it will not adhere to the blank while the folding is being done.

To form the tire into tubular form, the core 69 is placed around the composite blank, substantially midway between the side edges of the same, and the pin 70 at one end of the core is fitted into a perforation in the opposite end of the core, so that said core will encircle the blank, leaving the handle free. The blank is then folded upon itself and over the core for five or six inches, preferably where the valve-stem has been inserted, and one side edge is lapped over the other. The joint thus made is closed permanently by passing a roller over the same or pressed down by hand, whereby the tire is formed into a tube at this point, after which the tube is practically completed by tube-forming mechanism carried upon the table 16 and hereinafter more particularly described.

Upon the turn-table 16 and extending substantially radially thereof is the slideway 72, suitably fastened in place and which receives the slide 73, to which the tube-forming mechanism is connected.

After the tire-blank has been punched and the core applied thereto the table 16 is rotated in the manner hereinbefore described, so as to bring the outer end of the slideway 72 in proximity to the inner edge of the drum 4.

The slide 73 is adapted to be drawn out toward the drum 4 and is adapted to be firmly held in its advanced position, and I will now set forth the means shown for this purpose.

The vertically-disposed branches of the substantially U-shaped standard or yoke 74 are fastened to the opposite sides of the channeled slideway 72, near the outer end thereof, the cross-piece of the standard having a slot 75, adapted to receive the tooth 76 upon the spring-latch 77, the inner end of the spring-latch being rigidly fixed to the nut 78, having a depending shank fitted at its lower end in a channel in the upper side of the slide 73. It will be understood, therefore, that when the slide 73 is drawn out the nut 78, and hence the spring-latch 77, are carried therewith, whereby when the slide has reached its proper advanced position the tooth 76 of the latch 77 will be forced into the slot 75 in order to hold said slide firmly in the desired position. To the outer end of the slide 73 is hinged the shank or body 80 of the bar 81, the two parts presenting substantially a T-shaped form, the said bar when the slide is drawn out the proper distance being parallel with the opposite edges of the drum. The hinged body 80 is provided upon its outer side with a loop 82, through which the body 83 of the bar 84 is slidable, the body 83 and bar 84 presenting, like the corresponding parts, an approximately T-shaped structure, and it will be seen that the two bars are in parallelism. The hinged body or shank 80 is shown as being channeled to slidingly receive the transverse projection 85 upon the inner end of the body 83, said projection being furnished at a suitable point in its length with the oppositely-disposed studs or pins 86, which travel in the longitudinal slots 87 in the walls of the channeled body 80. It will be evident that the bar 84 can be adjusted toward and from the coöperating bar 81, this being to adapt the machine for forming tubes of different diameters.

The slide 73 at a suitable point in its length is provided with the block 88, from which the rigid arms 89 extend forward, the upper sides of the arms normally supporting the oppositely-disposed pins 90 on the body 83. Upon the upper side of the slideway 72, near the forward end thereof, are fastened the strips 91, terminating at their upper ends in hooks which overlie the upper faces of the two arms 89, whereby said arms will be maintained in an absolutely rigid horizontal position as the slide is advanced and retracted.

The body 83 is provided with a handle 92, which may consist of an eye or ring suitably secured in place and by which the slide 73 and the several parts connected therewith can be moved out across the periphery of the drum in order to bring the tube-forming means into position to make the tube from the composite strip hereinbefore described.

It will be assumed that the turn-table 16 has been rotated and thereafter locked in the manner hereinbefore described to bring the outer end of the slideway 72 in proximity to the drum 4, it being understood that at this time the said slideway is situated at right angles to the drum 4. The composite strip on said drum having been folded upon itself by hand in the manner hereinbefore described, the slide 73 is pulled out by means of the handle 92, and when it has reached the proper advanced position the tooth 76 is sprung into the slot 75 by the action of the spring-latch 77 in order to maintain said slide in the correct position. As the slide is pulled out, the pins 90 are traveling along the upper surface of the arms 89, and when they reach the outer end of said arms the bodies 80 and 83 are permitted to drop into a horizontal position, thereby carrying the pins 90 in line with the under surface of said arms. The upper body 83, which it will be understood is slidably supported on the lower body 80 and is then forced backward, carrying the two pins under the arms 89, so that both bodies, and hence the bars carried thereby, are held against elevation by said arms while the blank is being shaped into tubular form, it being remembered that the said arms are fixedly held by the hooks at the upper ends of the strips 91.

The nut 78, hereinbefore described, is adapted to receive the adjusting-screw 93, the forward end of which passes freely through an opening in the upper reduced end of the standard or block 88, the rear end of the screw being provided with a wheel 94, by which the screw can be readily operated, whereby when said screw is turned the slide 73, and hence the body 80, hinged thereto, can be moved inwardly or outwardly in order to properly adjust the bar 81 crosswise of the periphery of the drum 4, to thereby bring the said bar into proper position for effecting the formation of the tube. The outer bar 84 has its body slidably supported by the body 80, so that the outer bar can be readily moved toward and from its companion in order to provide for the forming of tires of different diameters and to allow the stock-folder to be placed over the composite strip.

I will now set forth the means illustrated for holding the bar 84 in fixed parallel relation with the bar 81 during the formation of a tube.

Upon the upper side of the body 81 is pivoted at or near its elbow the angle-lever 95, one arm of which is provided with a handle, by which said lever can be readily manipulated, the other and what is shown as the shorter arm of the lever having an extensible plate or strip 96. The said plate or strip 96 has at or near its free end the notch 98, adapted to receive the fixed pin or detent 99 upon the upper side of the loop 82, which loop, it will be understood, is fixed relatively to said lever. It will be understood that the plate 96 constitutes, in effect, a part of the locking-arm of the angle-lever, by virtue of which the effective length of said arm may be increased or decreased in order to correspondingly regulate the distance between the parallel bars 84 and 81. When the length of the locking-arm of the angle-lever 95 has been adjusted to the desired extent in order to properly space the two bars, the lever 95 is operated in order to effect the introduction of the fixed pin 99 into the notch or seat 98. When the pin is seated in the notch, the two bars mentioned are held in rigid parallelism. It will be assumed that the side edges of the composite strip hereinbefore described have been lapped over each other laterally in order to form the strip into a short tubular structure, such operation being performed by hand, and that the two bars 81 and 84 have been carried across the periphery of the drum 4 and are adjusted with respect to each other. During this time the drum, it will be understood, is at rest. The folder is shown at 100, and it consists of an elongated plate of substantially concavo-convex form in cross-section having a reduced rounded inner end. This folder or plate is fastened at its rear end to the upper side of the wedge-shaped piece 101, suitably connected to the upper arm of the substantially V-shaped guide 102. The guide 102 is provided at its outer end with an approximately angular body 103, the horizontal portion of which is adapted to removably fit the slot 104 at what might be considered the entering end of the bar 84, said V-shaped guide having a handle 105 of some suitable kind by which the body 103 can be readily slipped into and taken from the slot in order to place the folder 100 in position between the bars 84 and 81 or remove the same. Normally the folder and guide connected therewith are dismounted from the bar 84, such folder and guide being employed only when the tube is to be automatically formed. The composite tire-strip having been closed by hand, as set forth, the drum 4 is rotated by hand to bring such closed portion with one end thereof adjacent to the entering end of the bars 81 and 84. The folder 100 is then inserted into the closed portion of the tire and one edge of the composite strip near the closure is lapped over the upper surface of said folder. The under edge of the strip is introduced into the V-shaped opening of the guide 102, whereby when the drum is rotated by power, which is accomplished in the manner hereinbefore set forth, the folder will automatically fold one edge of the strip over the other—that is, said edges are brought into overlapping relation as the drum is rotated. To retain the tube in proper form, its side edges are adapted to pass through the peripheral grooves of the vertically-disposed rollers 106, depending from the bars 81 and 84 and arranged in coöperating pairs, the heights of the rollers being decreased from the entering toward the leaving end of the bars. Said rollers retain the tube in proper shape around the core, the first two or highest rollers coöperating with the folder in shaping the blank into tubular form. Arranged in a plane between the rollers 106 is a second pair of rollers 107, mounted at the opposite ends of the carrier 108, the axes of the last-mentioned rollers being in a plane at right angles to those of the first-mentioned rollers. The innermost roller 107 is of smaller diameter than the other roller 107. The stems 109 (shown as four in number) rise from the carrier 108 and project through properly-disposed perforations in the flange 110 upon the outer bar 84, said stems being united at their tops by the plate 111, and being surrounded by coiled springs 112, bearing against the under side of the plate and the upper side of the flange and serving to hold said plate, and consequently the carrier 108, with the rollers 107, elevated. Upon the upper side of the plate 111 is the projection 113, the top face of which is convex and is adapted to be engaged by the long arm of the lever 95. Normally said long arm is disengaged from the projection, during which time the several parts just mentioned are elevated by the coiled springs. When, however, the bar 84 is adjusted with respect to its companion to aid in the formation of the tire, it is held locked by throwing the lever in the manner hereinbefore described, and at the same time the long arm of the lever rides along the convex face of the projection 113, thereby depressing the plate 111, and consequently the stems 109 and carrier 108, by reason of which the rollers 107 are also lowered to carry the latter into position to press the joint between the overlapping edges of the composite strip, which strip as it passes under the rollers is of tubular form, and such joint is thereby made permanent.

It will be understood that during the formation of the tube by hand and automatically in the manner described, the core 69 is inclosed therein, the core being prevented from adhering to the said tube by reason of its coating of soap-water. As the tube is formed the rollers 107 press down against the joint or seam between the overlapped edges of the several strips, and after the action of said rollers 107 the overlapped edges of the tube are brought under the action of a third roller 114, which is mounted and operated precisely like the roller 40, hereinbefore described. When the tube-forming means is put into action, the roller 114 is brought into position to press against the overlapped joint between the strips of material laid upon the drum. This roller 114 acts exactly like but is shorter than the roller 40, and presses the overlapped plies together to form a permanent joint after the same pass the two rollers 107. Not only does the roller 114 press together the lapped-over edges of the blank, but also the entire surface of the strip lying between the core and the roller and the tire and drum. It will be understood that the rollers 114 and 107 act simultaneously, but at different points in the length of the tire. When the tire-blank has been nearly shaped into tubular form, the drum 4 is stopped and the folder 100 removed. The body 83 is pulled out, carrying the pins 90 from under the arms 89, said body being lifted by hand, and when the pins are in line with the upper face of the arms the said body is pulled inward to its initial position by a spring 89', connected therewith and also with the fixed part of the table, which naturally returns the under body 80 to its original position, the said body 83 as it is lifted engaging the depending lug 123 at the free end of the spring-latch 77, so that the tooth 76 is carried out of the slot 75 in order to secure the function set forth. The operation just described carries the bars 81 and 84 inward beyond and above the inner edge of the drum 4. It will be understood that a small portion of the tire-blank is left open, so that when the ends of the core 69 are disconnected said core by pulling upon the handle 71 can be withdrawn from the practically-finished tube. The tire-blank is then closed on itself by hand for the remainder of its length, so that a completely annular tube is formed surrounding the drum, and the part which has been closed by hand can be rolled by the roller 114 by rotating the drum 4, or the rolling operation can be performed by an independent hand-operated roller. The completely-formed tire is then taken from the drum 4 and may be cured in the usual manner.

Having described my invention, what I claim is—

1. In a machine of the class described, a member adapted to receive superposed strips of material, and a second member having means for maintaining the uniform lateral relation of said strips throughout their length, one of said members being movable with respect to the other.

2. In a machine of the class described, a member adapted to receive superposed strips of material, and a second member for effecting the superposition of said strips on the first-mentioned member and for maintaining the uniform lateral relation of the said strips throughout their length, one of said members being movable with respect to the other.

3. In a machine of the class described, a rotary member adapted to receive superposed strips of material, and a second member having means for maintaining the uniform lateral relation of said strips as they are superposed upon the rotary member.

4. In a machine of the class described, a rotary drum the periphery of which is adapted to receive superposed strips of material, and means for maintaining the uniform relation of the strips throughout their length as the drum is rotated with the strips superposed thereon.

5. In a machine of the class described, a member adapted to receive superposed strips of material, a second member having means for maintaining the uniform lateral relation of said strips throughout their length, one of said members being movable with respect to the other, and means for pressing the strips together to form a blank.

6. In a machine of the class described, a member adapted to receive superposed strips of material to form a blank, a second member having means for maintaining the uniform lateral relation of said strips throughout their length, one of said members being movable with respect to the other, and means for forming said blank into a tube while on said first-mentioned member.

7. In a machine of the class described, a member adapted to receive superposed strips of material, a second member having means for maintaining the uniform lateral relation of said strips throughout their length, one of said members being movable with respect to the other, and means for perforating the superposed strips.

8. In a machine of the class described, a member adapted to receive superposed strips of material, a second member having means for maintaining the uniform lateral relation of said strips throughout their length, one of said members being movable with respect to the other, means for perforating the strips, and means for forming the strips into a tube while on the first-mentioned member.

9. In a machine of the class described, a rotary drum the periphery of which is adapted to receive superposed strips of material, means for maintaining the uniform lateral relation of the strips as the drum is rotated with the strips superposed thereon, and means for forming the superposed strips into a tube while on the drum.

10. In a machine of the class described, a rotary drum the periphery of which is adapted to receive superposed strips of material, a turn-table in coöperative relation with said drum, means carried by the turn-table for maintaining the uniform lateral relation of the strips as the drum is rotated with the strips superposed thereon, and means carried by the turn-table for forming the superposed strips into a tube.

11. In a machine of the class described, a rotary drum the periphery of which is adapted to receive superposed strips of material, a turn-table in coöperative relation with said drum, means carried by the turn-table for maintaining the uniform relation of the strips as the drum is rotated with the strips superposed thereon, means carried by the turn-table for forming the superposed strips into a tube, and means for locking the turn-table against movement.

12. In a machine of the class described, a rotary drum the periphery of which is adapted to receive superposed strips of material, a turn-table in coöperative relation with the drum, means on the turn-table for maintaining the uniform lateral relation of the strips as the drum is rotated with the superposed strips thereon, and mechanisms also carried by the turn-table for perforating the superposed strips and then forming the same into a tube.

13. In a machine of the class described, a rotary drum the periphery of which is adapted to receive superposed strips of material, a turn-table, means carried by the turn-table for maintaining the uniform lateral relation of the strips as the drum is rotated with the strips superposed thereon, mechanisms carried by the turn-table for perforating the strips and forming the same into a tube, a plurality of handles carried by the turn-table, each handle having a manually-operable bolt, and a socket upon the framework of the machine adapted to be engaged by the working ends of the bolts.

14. In a machine of the class described, a rotary drum the periphery of which is adapted to receive superposed strips of material, means for maintaining the uniform lateral relation of the strips as the drum is rotated with the strips superposed thereon, a driven member connected with the drum, a shiftable driving member, and means for moving the driving member into and out of coöperative relation with the driven member.

15. In a machine of the class described, a rotary drum the periphery of which is adapted to receive superposed strips of material, means for maintaining the uniform lateral relation of the strips as the drum is rotated with the strips superposed thereon, a disk splined to the shaft of the drum for sliding movement, a second disk for actuating the other one, said second disk being shiftably mounted, and means for moving the second disk into and out of contact with the first disk.

16. In a machine of the class described, a member adapted to receive superposed strips of material, a second member having a plurality of leaves adapted to rest one upon the other and each leaf having a channel arranged to receive one of the strips, and one of said members being movable with respect to the other.

17. In a machine of the class described, a member adapted to receive superposed strips of material, a second member having a plurality of leaves adapted to fold one upon the other and each leaf having a channel arranged to receive one of the strips, one of said members being movable with respect to the other, and the widths of the channels being adjustable.

18. In a machine of the class described, a member adapted to receive superposed strips of material, a second member having a plurality of hinged leaves adapted to fold upon one another and each leaf having a channel to receive one of the strips, and one of the said members being movable with respect to the other.

19. In a machine of the class described, a member adapted to receive superposed strips of material, a second member having leaves adapted to be moved into coöperative relation with the first member and each leaf having a channel to receive one of the strips, and one of the members being movable with respect to the other.

20. In a machine of the class described, a rotary drum the periphery of which is adapted to receive superposed strips of material, a member having a plurality of leaves movable across the periphery of the drum and each leaf having a channel to receive a strip.

21. In a machine of the class described, a rotary drum the periphery of which is adapted to receive superposed strips of material, a slide provided with a plurality of hinged leaves each leaf being adapted to extend across the periphery of the drum and having a channel to receive a strip.

22. In a machine of the class described, a rotary drum the periphery of which is adapted to receive superposed strips of material, a slide provided with a plurality of hinged leaves each leaf being adapted to extend across the periphery of the drum and having a channel to receive a strip, and the lowermost strip having means adapted to receive the free ends of the other strips.

23. In a machine of the class described, a rotary drum the periphery of which is adapted to receive superposed strips of material, a member provided with a plurality of leaves shiftable across the periphery of the drum and each leaf having a channel to receive a strip and the lowermost leaf being furnished with a roll adapted to travel in contact with the periphery of said drum.

24. In a machine of the class described, a member adapted to receive superposed strips of material, a second member having means for maintaining the uniform lateral relation of the strips throughout their length, one of said members being movable with respect to the other, and a roller to press the strips together after they have been laid upon the drum.

25. In a machine of the class described, a rotary drum the periphery of which is adapted to receive superposed strips of material, a turn-table in coöperative relation with said drum, a member upon the turn-table provided with means for maintaining the uniform lateral relation of the strips as the drum is rotated with the strips superposed thereon, and a roller also carried by the turn-table for pressing the strips together after they have passed said member.

26. In a machine of the class described, a rotary drum the periphery of which is adapted to receive superposed strips of material, a turn-table in coöperative relation with the drum, a slide upon the table provided with a plurality of hinged leaves adapted to be shifted across the periphery of said drum and each having a channel to receive a strip, and a second slide also carried by the turn-table and provided with means for perforating the superposed strips.

27. In a machine of the class described, a rotary drum the periphery of which is adapted to receive superposed strips of material, a turn-table in coöperative relation with the drum, a slide upon the table provided with a plurality of hinged leaves adapted to be shifted across the periphery of said drum and each having a channel to receive a strip, a second slide also carried by the turn-table and provided with means for perforating the superposed strips, and a third slide on the turn-table provided with tube-forming mechanism.

28. In a machine of the class described, a rotary drum adapted to receive superposed strips of material, a turn-table in coöperative relation with the drum, a plurality of slides mounted upon the turn-table, means connected with one slide for maintaining the uniform lateral relation of the strips as the drum is rotated with the strips superposed thereon, means connected with the second slide for perforating the superposed strips, means connected with the third slide for forming the strip into a tube, and means carried by the fourth slide for pressing the strips together.

29. In a machine of the class described, a member adapted to receive a strip of material, and a second member having a device for folding the strip into tubular form, and one of said members being movable with respect to the other.

30. In a machine of the class described, a rotary member adapted to receive a strip of material, and a second member having a device for folding the strip into tubular form while on said member, and one of said members being movable with respect to the other.

31. In a machine of the class described, a member adapted to receive a strip of material, a second member having a device for folding the strip into tubular form, and means for maintaining such tubular form after the action of said forming device, and one of said members being movable with respect to the other.

32. In a machine of the class described, a pair of bars disposed in parallelism, grooved rollers arranged in coöperating pairs and depending from said bars, and a folding device supported in a plane between the said bars.

33. In a machine of the class described, a rotary drum adapted to receive upon its periphery a strip of material, and a member having a device for folding the strip into tubular form while on the rotating drum.

34. In a machine of the class described, a pair of bars one of which is adjustable toward and from its companion, grooved rollers arranged in pairs and supported by said bars, and a folding device supported in a plane between said bars.

35. In a machine of the class described, a pair of bars, grooved rollers arranged in pairs and carried by the bars and one of the latter being movable toward and from its companion, a roller supported between said bars, means for depressing said roller and for simultaneously locking the adjustable bar in fixed position with respect to its companion, and a folding device coöperative with said rollers.

36. In a machine of the class described, a pair of bars, grooved rollers arranged in pairs and carried by the said bars, a vertically-movable carrier supported in a plane between the side bars, means for depressing the carrier, a roller supported by said carrier, and a folding device supported in a plane between said bars.

37. In a machine of the class described, a slide, means for locking the slide in a fixed position, a member hinged to the slide and provided at its outer end with a cross-bar, a second bar in parallelism with the other bar and having a body slidingly supported by said hinged member, grooved rollers supported by said bars, and a folding device mounted in a plane between the bars.

38. In a machine of the class described, a slide, means for locking the slide in a fixed position, a member hinged to the slide and provided at its lower end with a cross-bar, a second bar in parallelism with the other bar and having a body slidingly supported by said hinged member, grooved rollers supported by the said bars, a folding device mounted in a plane between the rollers, and means for adjusting said slide.

39. In a machine of the class described, a slide, means for locking the slide in a fixed position, a member hinged to the slide and provided at its outer end with a cross-bar, a second bar in parallelism with the other bar and having a body slidingly supported by said hinged member, grooved rollers supported by the said bars, a folding device mounted in a plane between the bars, means for adjusting said slide, and means for positively holding said slide in its adjusted position.

40. In a machine of the class described, a pair of parallel bars, grooved rollers connected with the bars, a pressure-roller, a carrier for the pressure-roller, a plate connected with the carrier and having a projection upon its upper side provided with a convex face, and a lever adapted to travel along said convex face.

41. In a machine of the class described, a member provided with a hinged body furnished with a cross-bar at one end, said body being slotted, a second body provided with a cross-bar in parallelism with the other bar, said second body being slidingly supported by the first body and having pins slidable in the slots of said second body, a lever mounted on the second body and having a notched end, a pin fixed relatively to the second body to enter said notch, grooved rollers on said bars, and a folding device supported in a plane between the bars.

42. In a machine of the class described, a member provided with a hinged body furnished with a cross-bar at one end, said body being slotted, a second body having a cross-bar in parallelism with the other bar and slidingly supported by said other body and having pins to travel in the slots of said slotted body, a lever mounted on the second body and provided with an adjustable portion having a notch, a pin fixed relatively to the second body, to enter said notch, grooved rollers on said bars, and a folding device supported between the said bars.

43. In a machine of the class described, a slide provided with a hinged body having slots and a cross-bar at one end, a second body supported by said first body and also having a cross-bar in parallelism with the other bar, elongated arms on the slide, pins on the second body to travel against the upper and lower sides of said arms, grooved rollers carried by said bars, a folding device supported by said bars, a nut having a depending shank fitted in the channel in said slide, a spring-latch provided with a tooth, a fixed standard having a slot to receive said tooth, and an adjusting-screw coöperating with said nut.

In testimony whereof I have hereunto set my hand in presence of two subscribing witnesses.

UZZIEL P. SMITH.

Witnesses:
 HEATH SUTHERLAND,
 GEO. W. REA.